(12) United States Patent
Tertuliani et al.

(10) Patent No.: US 11,752,945 B2
(45) Date of Patent: Sep. 12, 2023

(54) ROOF RACK SYSTEM FOR A VEHICLE

(71) Applicant: Honda Motor Co., Ltd., Tokyo (JP)

(72) Inventors: Ian P. Tertuliani, Marysville, OH (US); Jason Scott Borland, Marysville, OH (US); Jesse W. Schlabach, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 16/783,302

(22) Filed: Feb. 6, 2020

(65) Prior Publication Data

US 2021/0245668 A1     Aug. 12, 2021

(51) Int. Cl.
    *B60R 9/048*     (2006.01)
    *B60R 9/052*     (2006.01)
    *B60R 9/04*     (2006.01)

(52) U.S. Cl.
    CPC .................................. *B60R 9/04* (2013.01)

(58) Field of Classification Search
    CPC ............ B60R 9/04; B60R 9/045; B60R 9/058
    USPC .................................................. 224/315, 326
    See application file for complete search history.

(56) References Cited

U.S. PATENT DOCUMENTS

| | | | | |
|---|---|---|---|---|
| 4,279,368 A | * | 7/1981 | Kowalski | .................. B60R 9/04 224/309 |
| 4,426,028 A | * | 1/1984 | Bott | .......................... B60R 9/04 224/325 |
| 4,428,517 A | * | 1/1984 | Bott | ......................... B60R 9/045 224/319 |
| 4,723,696 A | * | 2/1988 | Stichweh | ................ B60R 9/058 224/322 |
| 4,728,019 A | * | 3/1988 | Olliges | ...................... B60R 9/12 224/315 |
| 4,834,448 A | * | 5/1989 | Sakamoto | ............... B60R 9/058 296/210 |

(Continued)

FOREIGN PATENT DOCUMENTS

| | | |
|---|---|---|
| CN | 208411592 U | 1/2019 |
| DE | 10105166 A1 | 8/2002 |

(Continued)

OTHER PUBLICATIONS

Machine Translation of DE202018104554, made Mar. 11, 2021. (Year: 2019).*

(Continued)

*Primary Examiner* — Adam J Waggenspack
(74) *Attorney, Agent, or Firm* — Plumsea Law Group, LLC

(57) ABSTRACT

A roof rack system for a vehicle including a bracket base configured to be secured to a roof of the vehicle, the bracket base including at least one base opening disposed on an angled base side surface; a roof rail configured to be secured to the bracket base; a bracket stay secured to an underside of the roof rail, the bracket stay including at least one stay opening disposed on an angled stay side surface, the at least one stay opening being aligned with the at least one base opening; and a fastening mechanism configured to be coupled through the at least one stay opening in the bracket stay and the at least one base opening in the bracket base to thereby secure the roof rail onto the bracket base. Also, a method of installing a roof rail on a roof of a vehicle.

18 Claims, 6 Drawing Sheets

(56) References Cited

U.S. PATENT DOCUMENTS

| | | | | |
|---|---|---|---|---|
| 4,858,803 | A * | 8/1989 | Gerber | B60R 9/048 224/329 |
| 5,044,854 | A * | 9/1991 | Oh | F16B 37/04 411/344 |
| 5,497,925 | A * | 3/1996 | Lumpe | B60R 9/04 224/309 |
| 5,622,298 | A * | 4/1997 | Cucheran | B29C 45/1704 224/316 |
| 5,636,954 | A * | 6/1997 | Henderson | B60R 9/04 224/326 |
| 5,975,391 | A * | 11/1999 | Aftanas | B60R 9/04 224/309 |
| 5,979,723 | A | 11/1999 | Tress et al. | |
| 6,182,876 | B1 * | 2/2001 | Moliner | B60R 9/058 224/321 |
| 6,419,134 | B1 * | 7/2002 | Grimm | B60R 9/058 224/309 |
| 7,182,233 | B1 * | 2/2007 | Graffy | B60R 9/04 224/309 |
| 7,204,396 | B1 * | 4/2007 | Stapleton | B60R 9/04 224/309 |
| 7,226,101 | B2 * | 6/2007 | Raffler | B60R 9/04 224/309 |
| 7,370,780 | B2 * | 5/2008 | Thiele | B60R 9/05 224/309 |
| 7,866,516 | B2 * | 1/2011 | Binder | B60R 9/04 224/322 |
| 8,496,147 | B2 * | 7/2013 | Binder | B60R 9/04 224/326 |
| 8,534,517 | B2 * | 9/2013 | Binder | B60R 9/04 224/326 |
| 9,327,653 | B2 * | 5/2016 | Sirrenberg | B60R 9/04 |
| 10,005,403 | B2 * | 6/2018 | Calvin | B60J 7/106 |
| 2003/0178458 | A1 * | 9/2003 | Trambley | B60R 9/04 224/326 |

FOREIGN PATENT DOCUMENTS

| | | | |
|---|---|---|---|
| DE | 102012000827 | A1 | 7/2013 |
| DE | 202018104554 | * | 11/2019 |
| DE | 202018104554 | U1 † | 11/2019 |
| JP | H0930335 | A | 2/1997 |
| JP | 2840044 | B2 | 12/1998 |
| JP | 6398314 | B2 | 10/2018 |

OTHER PUBLICATIONS

Espacenet Machine Translation of CN Patent No. 208411592 U, dated Jan. 22, 2019.
Espacenet Machine Translation of DE Patent No. 10105166 A1, dated Aug. 8, 2002.
Espacenet Machine Translation of DE Patent No. 102012000827 A1, dated Jul. 18, 2013.
Espacenet Machine Translation of JP Patent No. 6398314 B2, dated Oct. 3, 2018.
Espacenet Machine Translation of JP Patent No. H0930335 A, dated Feb. 4, 1997.
Espacenet English LanguageTranslation of the Abstract of JPH08324346A Published Dec. 10, 1996, which is an earlier publication of JP Patent No. 2840044 B2, dated Dec. 24, 1998.

\* cited by examiner
† cited by third party

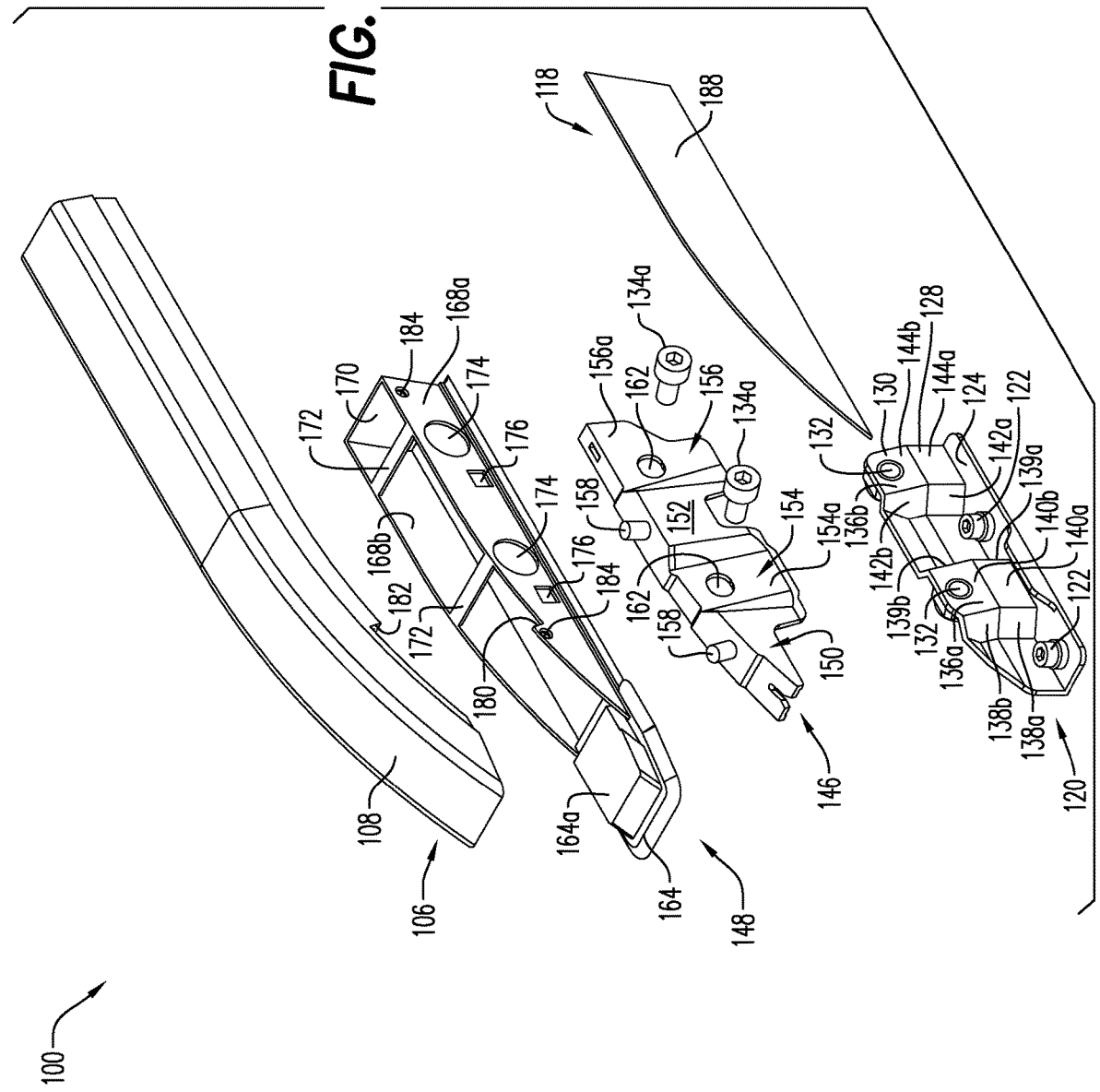

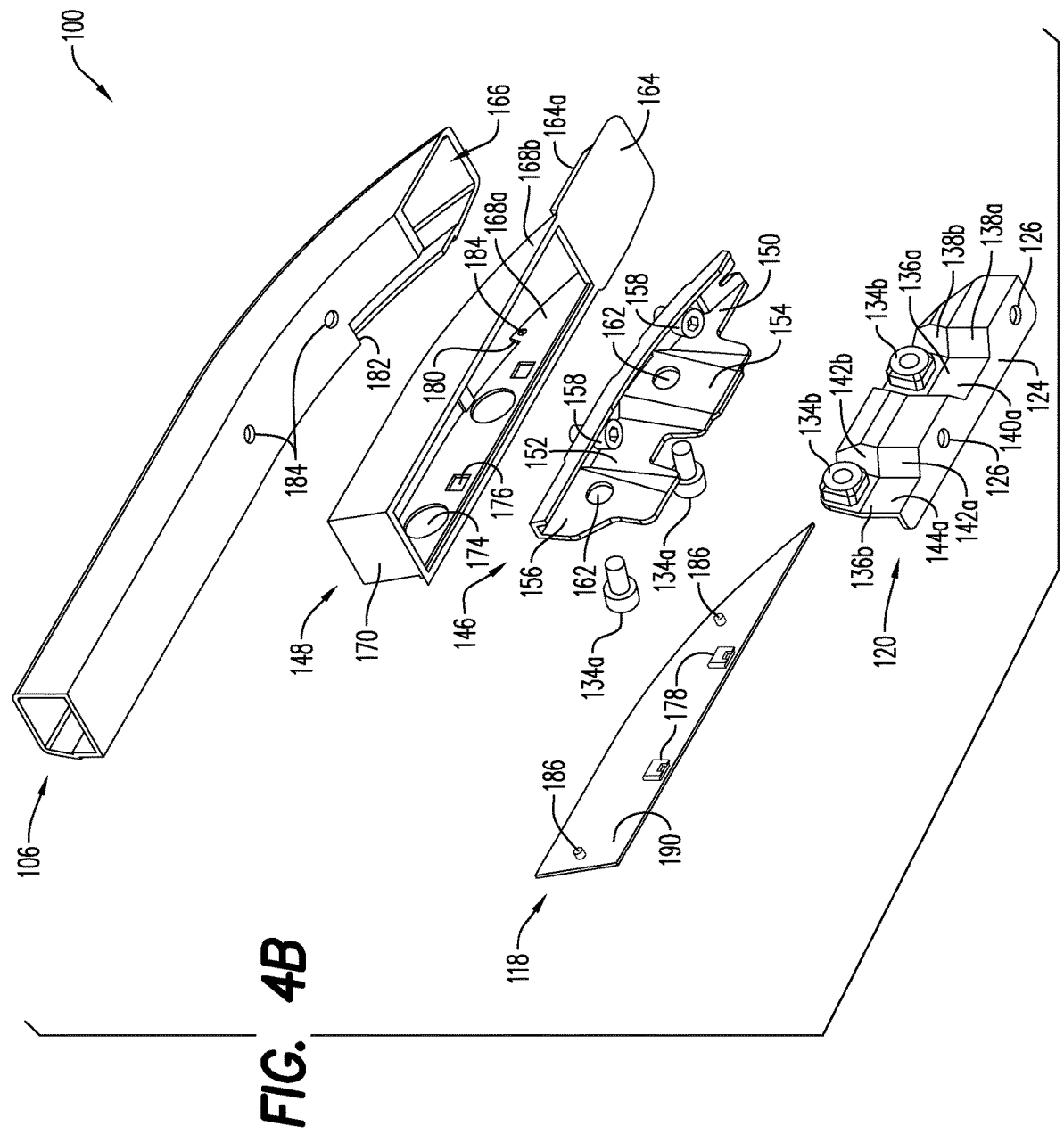

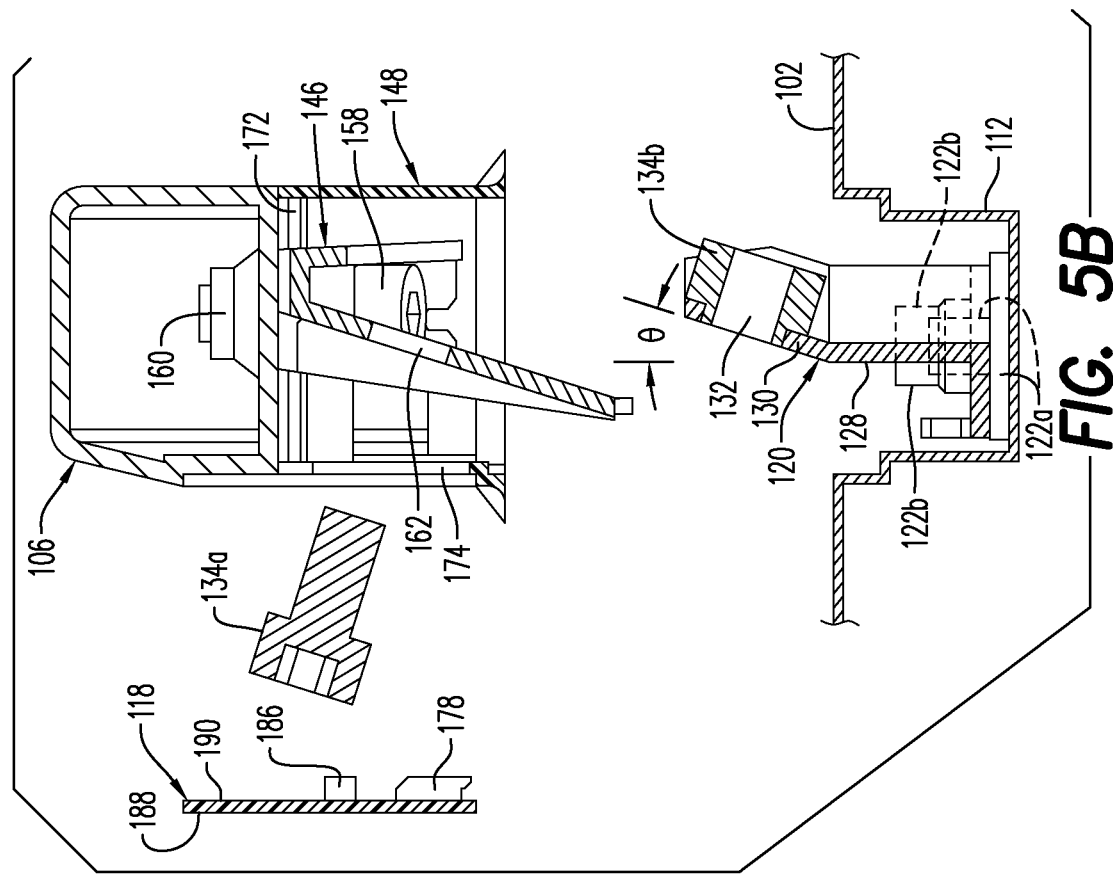
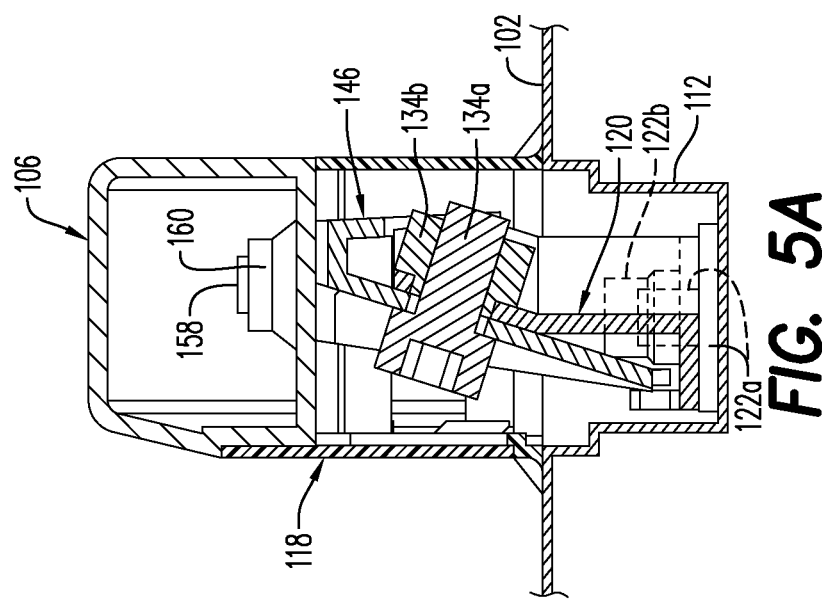
FIG. 5B
FIG. 5A

ROOF RACK SYSTEM FOR A VEHICLE

BACKGROUND

1. Field of the Disclosure

The present disclosure relates to a roof rack system for a vehicle and more particularly, to a roof rack system having angled mounting bolts which allow for installation of a roof rack to the roof of the vehicle from a side of the vehicle.

2. Description of Related Art

Roof racks in general include a set of two longitudinally extending roof rails secured to the roof of a vehicle. Roof racks are used to carry bulky items, such as luggage for example. With the use of additional cross bars or specialty adapters, other large items such as bicycles, canoes, and skis, for example, can also be carried on the roof of a vehicle through the use of a roof rack. There are many factors in the design and use of roof racks, some of which include weight, strength, the profile for loading and unloading, as well as the available accessories. An additional factor to be considered in the design of a roof rack is the ease and convenience for installation of the roof rack, whether performed at the factory during original manufacture of the vehicle, or when dictated by repair or replacement at a later date.

During the manufacturing process of the vehicle roof, many modern vehicles are provided with fixed body bolts or studs that extend through the vehicle roof from the interior side to the exterior side of the vehicle. The body bolts are provided for the installation of roof racks or other roof accessories. The body bolts extend generally perpendicular to a surface of the vehicle roof. When the roof rack is being mounted at the factory, factory installers will set the rails in place on the vehicle roof so as to engage the body bolts therethrough, and then secure the bolts with a corresponding nut from the top of the rails. That is, since the body bolts extend perpendicularly through the roof, and through the roof rails, the installer must be able to reach the top of the vehicle roof in order to access the bolts and tighten the nuts or other fastening mechanism which then secures the rails to the roof. Depending upon the particular vehicle and the overall height of the vehicle roof, this process can become quite inconvenient, awkward, and labor intensive.

There is a need in the art for a system and method for a vehicle roof rack that provides for convenient installation of the roof rails to the top of the vehicle and easy access to the mounting bolts securing the roof rails to the top of the vehicle.

SUMMARY OF THE INVENTION

The disclosure herein is directed to a vehicle roof rack having one or more roof rails that provides convenient and easy access to the fastening elements utilized to install the roof rails to the top of the vehicle, and avoids the more labor intensive task of accessing the top of the roof of a vehicle in order to install a roof rail. More particularly, by providing a bracket base secured to existing body bolts or studs on a vehicle roof, and a bracket stay within the roof rail which is configured to be disposed over the bracket base, mounting bolts for the roof rails can be installed at an angle relative a plane perpendicular to the vehicle roof, and in particular at an acute angle less than 90°. That is, the mounting bolts to secure the roof rail to the top of vehicle can be inserted from a side of the roof rail, through openings in the bracket stay, and secured to fastening elements on a side face of the bracket base rather than the existing body bolts. Hence, factory associates, and consumers as well, will not have to reach all the way up to the top of vehicle roof in order to install a roof rack since access can be provided from the side of the roof rail according to the disclosure herein.

In one aspect, the disclosure provides a roof rack system for a vehicle having a bracket base configured to be secured to a roof of the vehicle, and the bracket base including at least one base opening disposed on an angled base side surface. A roof rail is configured to be secured to the bracket base via a bracket stay secured to an underside of the roof rail, the bracket stay including at least one stay opening disposed on an angled stay side surface. The at least one stay opening is aligned with the at least one base opening and a fastening mechanism is configured to be coupled through the at least one stay opening in the bracket stay and the at least one base opening in the bracket base to thereby secure the roof rail onto the bracket base.

An adapter system and method for mounting a roof rail on a vehicle is also provided according to a further aspect of the disclosure. The adapter system includes a bracket base configured to be secured to a roof of the vehicle, where the bracket base includes at least one base bolt opening disposed on an angled base side surface. A bracket stay is configured to be secured to an underside of the roof rail, and the bracket stay includes at least one stay bolt opening disposed on an angled stay side surface, the at least one stay bolt opening configured to be aligned with the at least one base bolt opening when the bracket stay is positioned over the bracket base. A fastening mechanism is configured to be inserted through the at least one stay bolt opening in the bracket stay and the at least one base bolt opening in the bracket base to thereby secure the roof rail to the bracket base.

In another aspect, a method of installing a roof rail on a roof of a vehicle is provided. The method includes securing a bracket base to the roof of the vehicle, securing a bracket stay to an underside of the roof rail, positioning the assembled bracket stay and rail relative to the bracket base, and installing a fastening mechanism through the bracket stay and through the bracket base to thereby secure the rail to the bracket base.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 4A is an exploded top perspective view of the roof rack system according to an exemplary embodiment of the disclosure.

FIG. 4B is an exploded bottom perspective view of the roof rack system shown in FIG. 4A.

FIG. 5A is a cross section taken generally along line 5A-5A in FIG. 1.

FIG. 5B is an exploded view of the cross section shown in FIG. 5A.

DETAILED DESCRIPTION

The disclosure is directed to a vehicle roof rack having one or more roof rails that provide convenient and easy access for installation of fastening elements to secure the roof rails to the top of the vehicle. An exemplary embodiment of the disclosure provides for mounting bolts to be installed at a predetermined angle relative to the roof rail. By providing a bracket base secured to existing body bolts on the vehicle roof, and a bracket stay within the roof rail configured to be disposed over the bracket base, mounting bolts for the roof rails can be installed at an angle, and in particular an acute angle less than 90°. That is, the mounting bolts can be inserted from a side surface of the roof rail, through openings in the bracket stay, and fastened to the bracket base, thereby securing the roof rail to the top of the vehicle. Hence, factory associates, and consumers as well, will not have to reach all the way up to the top of vehicle roof in order to install a roof rack since access can be provided from the side of the roof rail according to the disclosure herein.

Figure 1:
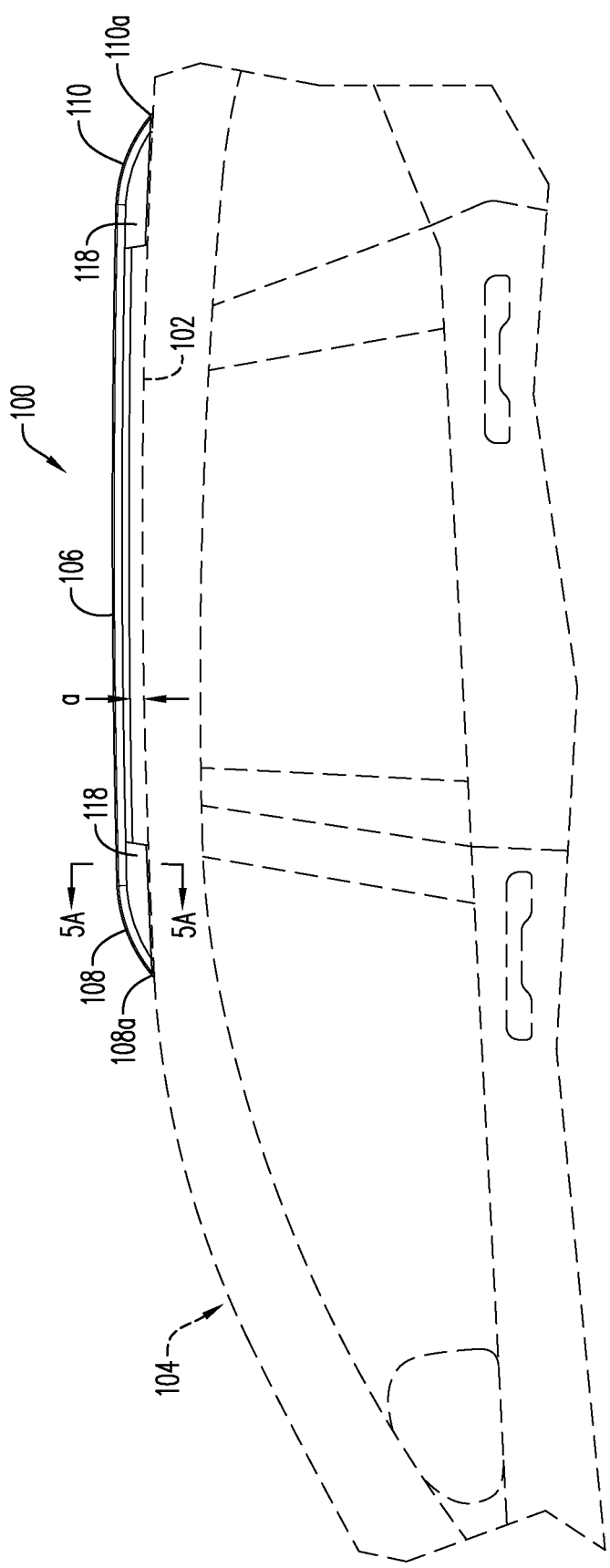
FIG. 1 is a side elevational view of a roof rack system according to an exemplary embodiment of the disclosure.
Figure 2:
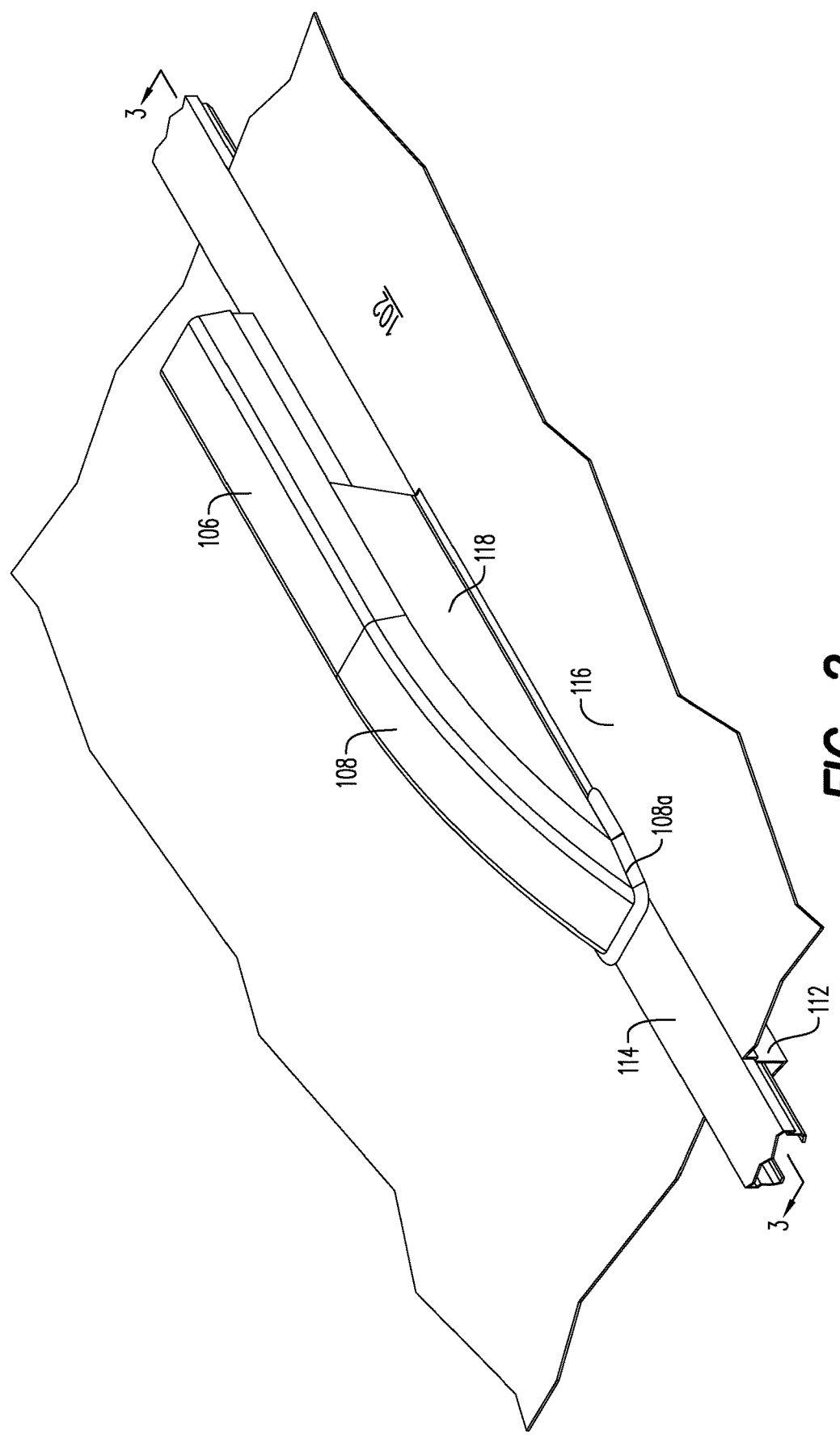
FIG. 2 is an enlarged perspective view of the roof rack system according to an exemplary embodiment of the disclosure.

Referring to FIG. 1, a side elevational view of a roof rack system according to an exemplary embodiment of the disclosure is shown generally by reference numeral 100. Roof rack system 100 is configured for attachment to a roof 102 of a vehicle 104. As shown, a roof rail 106 of the roof rack is spaced from the top of the vehicle roof 102 throughout a central region of the roof rail 106 by a distance a. One skilled in the art will appreciate that it is customary for at least two roof rails 106 to be provided on the roof of the vehicle in order to provide greater security for articles to be carried. The end portions 108, 110 of the roof rail 106 have a curved shape which extends downward such that the outer end 108a, 110a defines a lower surface substantially flush with an upper surface 116 of the roof 102. As best shown in FIG. 2, due to the curvature of end portions 108, 110, a generally sail-shaped, triangular region is defined on each end between the upper surface 116 of the roof 102 and the end portions 108, 110 of the roof rail 106. The triangular region is provided with a finishing cap 118 having a corresponding generally triangular shape in order to maintain the aesthetic appeal of the roof rack system 100. As also shown in FIG. 2, in the exemplary embodiment of the disclosure, the roof 102 includes a recessed groove or channel 112 formed in the roof 102 and molding trim 114 which extends along the channel 112 on each side of the triangular finishing cap 118.

Figure 3:
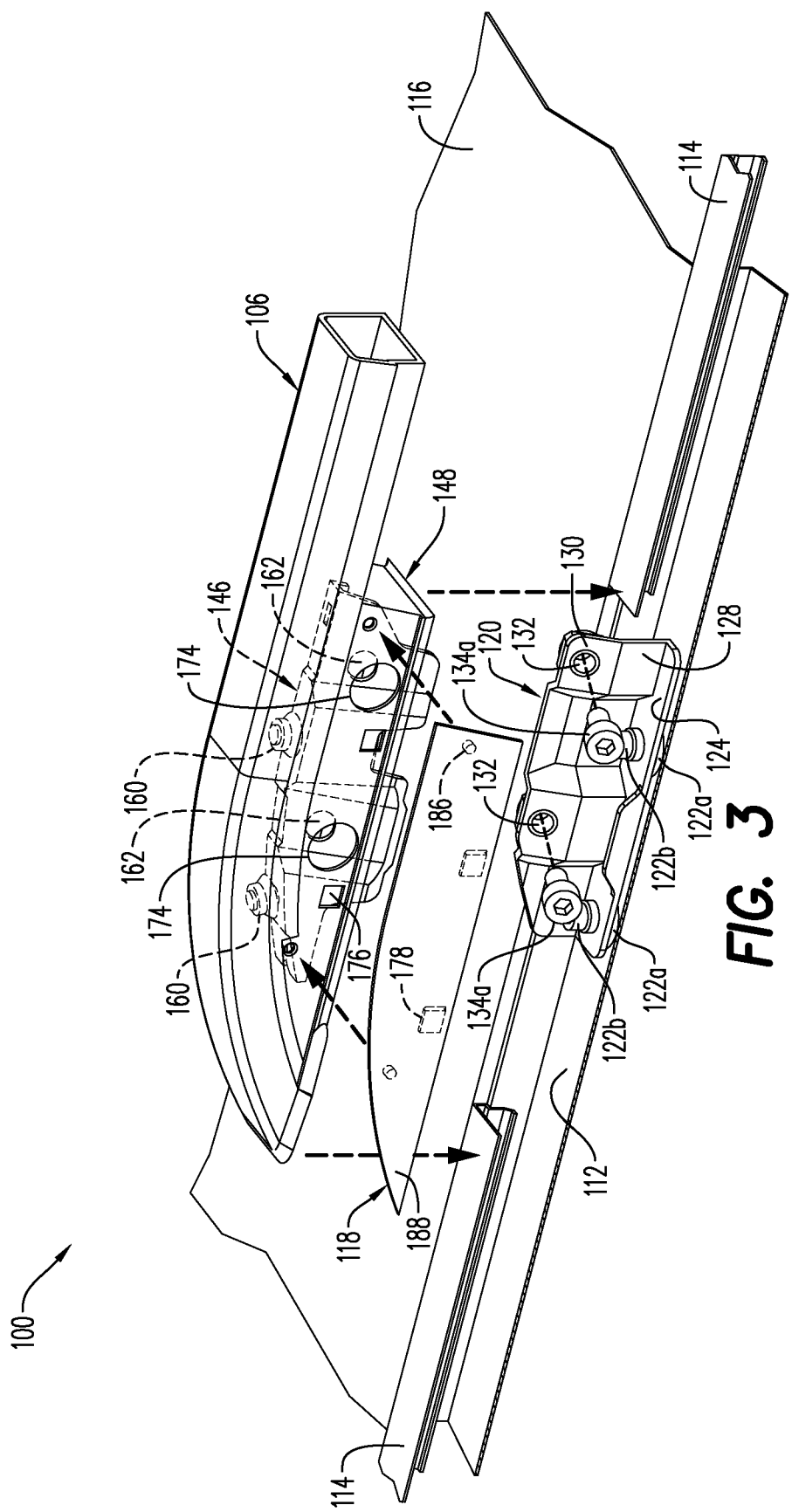
FIG. 3 is a partially exploded perspective view of the roof rack system according to an exemplary embodiment of the disclosure.

FIGS. 3-4B illustrate in greater detail the various components of the roof rack system 100 in accordance with an exemplary embodiment of the disclosure. The roof rack system 100 generally includes a bracket base 120, a cover 148, a bracket stay 146, and the finishing cap 118. The bracket base 120 is seated within the channel 112 and configured to be fixed to the roof 102 of the vehicle 104, as shown best in FIG. 3. The bracket stay 146 and cover 148 are affixed to an underside of the roof rail 106. The bracket stay 146 can then be fastened to the bracket base 120, thus securing the roof rail 106 to the roof 102 of the vehicle 104. The finishing cap 118 completes the assembly and covers the underlying bolts and connections to thereby provide an aesthetically pleasing appearance. Each of these components is discussed further below. In effect, the roof rack system 100, and in particular the bracket base 120 and bracket stay 146, define an adapter which allows the roof rail 106 to be installed by angled side mounting bolts connecting the bracket stay 146 to the bracket base 120 rather than the roof rail being directly secured to the perpendicularly disposed body bolts as previously known.

More particularly, the bracket base 120 includes a bottom flange 124 including one or more openings 126 (see FIG. 4B) through which fasteners 122a, 122b secure the bracket base 120 to the vehicle roof 102. The fasteners include any type of known fastening element, such as, for example, threaded bolts 122a and nuts 122b as in the exemplary embodiment, rivets, welds, or the like. More particularly, threaded bolt 122a is an M8 body bolt/stud with a corresponding M8 body nut 122b, as known in the art. In the exemplary embodiment, bolts 122a extend substantially perpendicular from the top surface of the roof 102 as known in the art. Bolts 122a further extend, however, through the openings 126 in the bottom flange 124 and nuts 122b then secure the bolts 122a and fasten the bracket base 120 within the channel 112 on the vehicle roof 102. It is also possible that bracket base 120 could be welded to the roof. The bracket base 120 further includes a first, lower sidewall portion 128 extending perpendicularly from the bottom flange 124 and a second, upper sidewall portion 130 extending from the first sidewall portion 128, portions of the second, upper sidewall portion 130 being at an angle relative to the first, lower side wall portion 128. The first and second sidewall portions 128, 130 have a somewhat undulating configuration defining two offset projections 136a, 136b. Projection 136a includes angled faces 138a, 138b and 139a, 139b and side faces 140a, 140b extending therebetween. Projection 136b includes angled faces 142a, 142b and side face 144a, 144b. As shown, each of the angled faces 138a, 139a, 142a encompasses a portion of the first sidewall 128 and each of the angled faces 138b, 139b, 142b encompasses a portion of the second side wall 130. Similarly, each of the side faces 140a, 144a encompasses a portion of the first sidewall 128 and each of the side faces 140b, 144b encompasses a portion of the second sidewall 130. Moreover, the side faces 140b, 144b of the second, upper sidewall portion 130 are disposed at an acute angle relative to a plane of the side faces 140a, 144a of the first sidewall portion 128. In the exemplary embodiment herein, and as illustrated best in FIG. 5B, the side faces 140b, 144b of the second sidewall portion form an angle θ between 30°-60° relative to a plane of the side faces 140a, 144a of the first sidewall portion 128, and more particularly, the angle θ between the side faces 140b, 144b of the second sidewall portion 130 and a plane of the side faces 140a, 144a of the first sidewall portion 128 is approximately 45°. The angled side faces 140b, 144b of second sidewall portion 130 further include an opening 132 and a fastener 134b disposed on a rear surface of the opening 132 such that fasteners 134a, 134b can be coupled, as explained in greater detail below.

The cover 148 is configured to engage an underside of the roof rail 106. The cover 148 includes an end portion 164 having a projection or raised area 164 than engages an opening 166 on the underside of the roof rail 106 (see FIG. 4B). The cover 148 further includes opposing side walls 168a, 168b and an end wall 170. In addition, at least one cross strut 172 is provided between the opposing side walls 168a, 168b to provide strengthening to the cover 148, with two cross struts 172 being shown in the exemplary embodiment. The cross struts 172 also aid in maintaining the position of the cover 148 within the roof rail 106 after attachment of the bracket stay 146 to the rail 106, as explained further below. In the exemplary embodiment shown, side wall 168a further includes a positioning notch 180 configured to engage a corresponding guide or guide member 182 on the underside of the roof rail 106. More particularly, the positioning notch 180 will be aligned with the guide 182 when the raised area 164 is disposed within the opening 166, thereby properly seating the cover 148 within the underside of the roof rail 106. According to the exemplary embodiment of the disclosure, the cover 148 further includes at least one aligning opening 184 (two aligning openings 184 being shown in the drawings) which is configured to receive corresponding aligning pin(s) 186 on the finishing cap 118.

The bracket stay 146 is configured to engage the bracket base 120 and the roof rail 106. The bracket stay 146 generally includes first and second sections 150, 152 adapted to engage the rail 106 and third and fourth sections 154, 156 adapted to engage the bracket base 120. More particularly, the first and second sections 150, 152 include openings (not shown) through which a bolt 158 extends in order to engage a nut 160 disposed within the roof rail 106 (see FIG. 3). Threaded screws or other types of fastening devices could of course also be used. The third and fourth sections 154, 156 include angled walls 154a, 156a configured to engage the angled side faces 140b, 144b, respectively, of the projections 136a, 136b on the bracket base 120. When the bracket stay 146 is disposed over the bracket base 120, the third and fourth sections 154, 156 will be aligned with the projections 136a, 136b and the openings 132 in the bracket base 120 will be aligned with the openings 162 in the bracket stay 146. That is, the openings 132 on the angled side faces 140b, 144b and the openings 162 on the angled walls 154a, 156a will be aligned and present an angled access opening for fasteners 134a to be inserted and coupled to fasteners 134b fixed on the rear surface of angled side faces 140b, 144b.

The finishing cap 118 is the final component of the roof rack system 100 to be installed. The finishing cap 118 has a generally triangular, sail-shaped, or three-sided configuration corresponding to the shape defined between end portion 108 and the roof 102 of the vehicle 104. The finishing cap 118 has a generally smooth or other aesthetically pleasing outer surface 188 since the outer surface 188 will define the exposed or exterior surface of the roof rail 106. The opposing inner surface 190 of the finishing cap 118 includes the aligning pins 186 configured to be received in the aligning holes or openings 184 in the cover 148. The inner surface 190 of the finishing cap 118 also includes tabs 178 that are configured to be engaged within the tab openings 176 provided in the cover 148. Thus, the finishing cap 118 is snapped into place on the cover 148 by tabs 178 and thereby conceals the various bolts and mounting hardware from view and provides a clean exterior appearance for the roof rack system 100.

FIG. 5A illustrates a cross section through the roof rail system 100, and FIG. 5B illustrates an exploded view of the cross section for greater clarify. As shown, the bracket base 20 is secured within the channel 112 by the fastener 122b disposed on the body bolt extending upwards in the channel 112. The cover 148 is seated within the rail 106 and the bracket stay 146 is fastened to the rail 106 by fasteners 158, 160. The bracket stay 146 is thus securing the cover 148 in place because the cross struts 172 are wedged between the bracket stay 146 and the cover 148. The rail 106, with the bracket stay 146 and cover 148 secured thereto, is positioned over the bracket base 120. The openings 132 (and nuts 136 fixed on a rear surface thereof) of the bracket base 120 are aligned with the openings 162 of the bracket stay 146 (which are already aligned with the openings 174 of the cover 148). Since the openings 132 and 162 are disposed at an acute angle relative to a plane of the roof 102, and not perpendicular to the roof like body bolts 122a, the mounting bolts 134a are inserted at an angle through openings 132 and 162 and fastened within nuts 134b. The roof rack system 100 can thus be installed from the side of the vehicle 104 rather than from the top of the roof 102 as previously known. That is, in accordance with an exemplary embodiment of the disclosure, mounting bolts 134a are inserted by an installer through the side openings 174 on the cover 148, which are aligned with openings 162 in the angled walls 154a, 156a of the stay 146, and through the openings 132 disposed on the angled faces 140b, 144b of the base 120 such that the mounting bolts 134 engage and are secured to the nuts 134b fixed to an opposing side of the angled faces 140b, 144b of the base 120. The roof rack system 100 of the disclosure herein thus provides a more convenient system and method for attaching roof rails 106 to the roof of a vehicle. The finishing cap 118 can also be removed to provide ready access to the mounting bolts 134a should repair or replacement ever be required.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A roof rack system for a vehicle comprising:
 a bracket base including a bottom flange, and a sidewall portion extending from the bottom flange, the sidewall portion including at least an angled base side surface disposed at an angle relative to the bottom flange and at least one base opening disposed on the angled base side surface;
 a roof rail configured to be secured to the bracket base;
 a bracket stay secured to an underside of the roof rail, the bracket stay including at least an angled stay side surface disposed at an angle relative to the bottom flange and at least one stay opening disposed through the angled stay side surface, the angled stay side surface engaging the angled base side surface such that the at least one stay opening is aligned with the at least one base opening;
 a cover element including at least one cover opening, the cover element being seated within the underside of the roof rail, the bracket stay holding the cover element within the underside of the roof rail such that the at least one cover opening is aligned with the at least one stay opening; and
 a fastening mechanism configured to be inserted from an exterior side of the vehicle through the at least one cover opening in the cover element and the at least one stay opening in the bracket stay, and then through the at least one base opening in the bracket base to thereby secure the roof rail onto the bracket base.

2. The roof rack system according to claim 1, wherein the angled base side surface and the angled stay side surface are configured to define an acute angle relative to a plane perpendicular to the bottom flange.

3. The roof rack system according to claim 2, wherein the acute angle is between 30 degrees and 60 degrees.

4. The roof rack system according to claim 3, wherein the acute angle is 45 degrees.

5. The roof rack system according to claim 1, wherein the bracket base further includes a lower sidewall portion disposed adjacent the bottom flange and the angled base side surface of the bracket base defines an upper sidewall portion, the upper sidewall portion extending from the lower sidewall portion.

6. The roof rack system according to claim 5, wherein the cover element includes at least one cover opening, the at least one cover opening being aligned with the at least one stay opening.

7. The roof rack system according to claim 6, further comprising a cap configured to be mounted on the cover element to thereby conceal the at least one cover opening and the fastening mechanism.

8. The roof rack system according to claim 1, wherein the fastening mechanism includes a bolt and a corresponding nut fixedly attached to a rear surface of the at least one base opening on the bracket base such that the bolt is inserted through the at least one stay opening in the bracket stay and the at least one base opening in the bracket base and secured by the corresponding nut on the rear surface of the at least one base opening.

9. An adapter system for mounting a roof rail on a vehicle, said adapter system comprising:
    a bracket base configured to be secured to a roof of the vehicle, the bracket base including a bottom flange including one or more openings configured to receive a fastening mechanism, a lower side surface extending from the bottom flange, and an angled base side surface extending from the lower side surface, the angled base side surface defining an acute angle relative to a plane of the lower side surface, and the angled base side surface including at least one base bolt opening;
    a bracket stay configured to be secured to an underside of the roof rail, the bracket stay including an angled stay side surface configured to define an acute angle relative to a plane perpendicular to the roof of the vehicle, the angled stay side surface including at least one stay bolt opening configured to be aligned with the at least one base bolt opening when the bracket stay is positioned over the bracket base;
    a cover element including at least one cover access opening, the cover element being configured to be seated within the underside of the roof rail and held in place by the bracket stay such that the at least one cover access opening aligns with the at least one stay bolt opening; and
    a fastening mechanism configured to be inserted, from an exterior side of the vehicle, through the at least one stay bolt opening in the bracket stay and then through the at least one base bolt opening in the bracket base to thereby secure the roof rail to the bracket base.

10. The adapter system according to claim 9, wherein the angled base side surface and the angled stay side surface define an acute angle relative to a plane perpendicular to the roof of the vehicle.

11. The adapter system according to claim 10, wherein the acute angle is between 30 degrees and 60 degrees.

12. The adapter system according to claim 11, wherein the acute angle is 45 degrees.

13. The adapter system according to claim 9, further comprising a cap configured to be secured to the cover element and thereby conceal the fastening mechanism.

14. A method of installing a roof rail on a roof of a vehicle comprising:
    securing a bracket base to the roof of the vehicle with fasteners extending from an interior of the vehicle, wherein the bracket base includes at least one base bolt opening;
    securing a bracket stay to an underside of the roof rail, wherein the bracket stay includes at least one stay bolt opening;
    positioning the assembled bracket stay and rail relative to the bracket base;
    providing a cover member including at least one cover botl opening, seating the cover member in the underside of the roof rail and aligning the at least one cover bolt opening with the at least one stay bolt opening, the bracket stay thereby holding the cover member in place in the underside of the roof rail; and
    installing a fastening mechanism from an exterior side of the vehicle through the bracket stay and then through the bracket base to thereby secure the rail to the roof of the vehicle.

15. The method according to claim 14, wherein said positioning including aligning the at least one base bolt opening and the at least one stay opening.

16. The method according to claim 15, wherein the at least one base bolt opening and the at least one stay bolt opening are disposed at an acute angle relative to a plane perpendicular to the roof of the vehicle, said installing the fastening mechanism including inserting the fastening mechanism at the acute angle relative to the plane perpendicular to the roof of the vehicle.

17. The method according to claim 14, further comprising securing a cap on the cover member, the cap concealing the at least one cover bolt opening and the fastening mechanism.

18. The method according to claim 14, wherein the cover member further includes an alignment notch and the underside of the roof rail includes a guide member, said seating the cover member including aligning the alignment notch with the guide member.

* * * * *